E. G. KINSLEY.
Corn Popper.
No. 70,723. Patented Nov. 12, 1867.
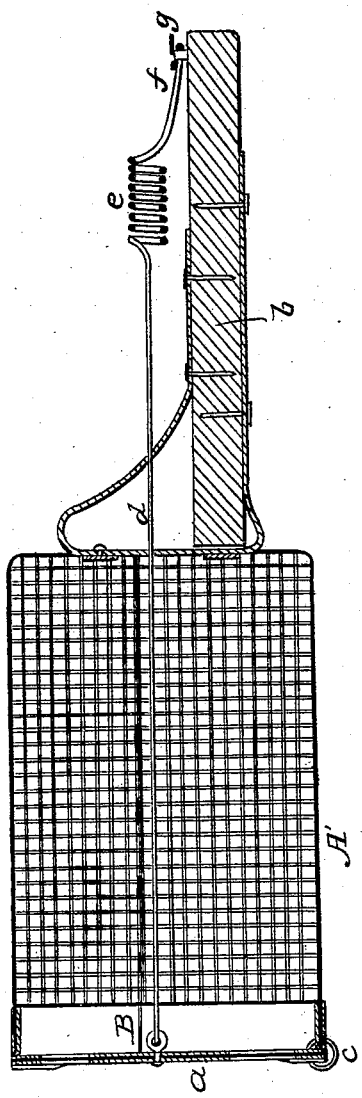
Witnesses:
S. N. Piper
Lauritz Möller
Inventor:
Edward G. Kinsley
by his attorney
R. H. Eddy

United States Patent Office.

EDWARD G. KINSLEY, OF STOUGHTON, MASSACHUSETTS.

Letters Patent No. 70,723, dated November 12, 1867.

---

IMPROVEMENT IN CORN-POPPERS.

---

The Schedule referred to in these Letters Patent and making part of the same.

---

TO ALL PERSONS TO WHOM THESE PRESENTS MAY COME:

Be it known that I, EDWARD G. KINSLEY, of Stoughton, in the county of Middlesex, and State of Massachusetts, have invented an Improved Apparatus for Popping or Parching Corn; and do hereby declare the same to be fully described in the following specification, and represented in the accompanying drawing, which denotes a longitudinal section of it.

In such drawing, A denotes a rectangular box, made of woven wire, open at one end, and provided with a door, $a$, to such end, and being, at its other end, affixed to a handle, $b$. The door is hung on hinges at $c$, and has a wire, $d$, extending from it through the bar, and terminating in a coiled spring, $e$, and a loop, $f$. When the loop is hitched on a nail, $g$, driven into the handle, the wire serves to hold the cover closed upon the end of the box. Across the middle of the box A is a partition, B, which is perforated with holes of a size large enough to allow the kernels of corn, before being parched, to pass through them, though not large enough to admit of such passage after they may have been parched.

In using the corn-popper, the kernels of corn are to be put into the space below the partition, and in this condition the popper is to be placed over a fire. After a sufficient number of the kernels may have been parched to fill the space, the implement is to be turned over one hundred and eighty degrees, so as to cause the unparched balance of the kernels to fall through the partition into the other space or half of the box. This having been done, the box should be again placed over the fire, so that the heat therefrom may strike directly upon the unparched kernels.

By constructing the box with the perforated partition there will be little or no danger of burning the parched kernels, for as soon as one-half of the box may be filled, or about so, the box may be turned over so as to remove the parched kernels from the direct heat of the fire, and cause it to strike on the unparched ones. The door, being at one end of the box, covers the end of the partition, and, when removed, exposes either half of the box, in order to enable corn to be placed therein or removed therefrom.

I claim the corn-popper, as made with the perforated divisional partition B, extended across its box A, of woven wire, substantially as described, and for the purpose as specified.

EDWARD G. KINSLEY.

Witnesses:
G. H. ANDREWS,
F. P. HALE, Jr.